United States Patent
Scherer et al.

(10) Patent No.: US 11,376,883 B2
(45) Date of Patent: Jul. 5, 2022

(54) SECURITY ELEMENT COMPRISING MICROREFLECTORS

(71) Applicant: GIESECKE+DEVRIENT CURRENCY TECHNOLOGY GMBH, Munich (DE)

(72) Inventors: Kai Herrmann Scherer, Munich (DE); Raphael Dehmel, Neubeuern (DE); Maik Rudolf Johann Scherer, Grainau (DE); Christian Fuhse, Otterfing (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 17/056,286

(22) PCT Filed: May 16, 2019

(86) PCT No.: PCT/EP2019/000146
§ 371 (c)(1),
(2) Date: Nov. 17, 2020

(87) PCT Pub. No.: WO2019/219236
PCT Pub. Date: Nov. 21, 2019

(65) Prior Publication Data
US 2021/0252900 A1    Aug. 19, 2021

(30) Foreign Application Priority Data
May 18, 2018   (DE) .................... 10 2018 004 088.8

(51) Int. Cl.
*B42D 25/324*    (2014.01)
*B42D 25/36*    (2014.01)
(Continued)

(52) U.S. Cl.
CPC ........... *B42D 25/324* (2014.10); *B42D 25/36* (2014.10); *B42D 25/425* (2014.10); *G02B 5/09* (2013.01)

(58) Field of Classification Search
CPC .... B42D 25/324; B42D 25/425; B42D 25/36; G02B 5/09
(Continued)

(56) References Cited

U.S. PATENT DOCUMENTS 9,827,802 B2   11/2017   Fuhse et al.
10,525,758 B2   1/2020   Fuhse et al.
(Continued)

FOREIGN PATENT DOCUMENTS

AU   2014356874 B2   6/2019
CA   2780934 A1   6/2011
(Continued)

OTHER PUBLICATIONS

International Search Report and Written Opinion from PCT Application No. PCT/EP2019/000146, dated Jul. 8, 2019.
(Continued)

*Primary Examiner* — Justin V Lewis
(74) *Attorney, Agent, or Firm* — Workman Nydegger

(57) ABSTRACT

A flat security element has a main plane and microreflector arranged in a microreflector pattern and present at least one motif that, when the security element is tilted, has a motif effect that relates to the main plane. The microreflector pattern causes a first and a second motif effect, wherein the first motif effect occurs during a tilting movement about a primary axis, if the security element is at the same time oriented within a first tilting angle range about a secondary axis, and the second motif effect occurs during the tilting
(Continued)

movement about the primary axis, if the security element is at the same time oriented within a second tilting angle range about the secondary axis.

19 Claims, 3 Drawing Sheets

(51) Int. Cl.
*B42D 25/425* (2014.01)
*G02B 5/09* (2006.01)

(58) Field of Classification Search
USPC ..... 283/67, 70, 72, 74, 91, 94, 98, 109, 901
See application file for complete search history.

(56) References Cited

U.S. PATENT DOCUMENTS

| | | |
|---|---|---|
| 10,525,759 B2 | 1/2020 | Rahm et al. |
| 2008/0258456 A1 | 10/2008 | Rahm et al. |
| 2013/0093172 A1 | 4/2013 | Fuhse et al. |
| 2013/0099474 A1 | 4/2013 | Fuhse et al. |
| 2018/0001690 A1 | 1/2018 | Fuhse et al. |
| 2018/0117947 A1* | 5/2018 | Fuhse .................. B42D 25/324 |
| 2020/0122499 A1 | 4/2020 | Hovestadt |

FOREIGN PATENT DOCUMENTS

| | | |
|---|---|---|
| DE | 102005061749 A1 | 7/2007 |
| DE | 102010025775 A1 | 1/2012 |
| DE | 102010055688 A1 | 6/2012 |
| DE | 102013019944 A1 | 5/2015 |
| DE | 102017004586 A1 | 11/2018 |
| EP | 2507069 A2 | 10/2012 |
| EP | 2588276 A1 | 5/2013 |
| WO | 2011066990 A2 | 6/2011 |
| WO | 2012000669 A1 | 1/2012 |
| WO | 2015078572 A1 | 6/2015 |
| WO | 2016180522 A1 | 11/2016 |
| WO | WO-2016180522 A1 * | 11/2016 ........... B42D 25/328 |

OTHER PUBLICATIONS

German Search Report from corresponding DE Application No. 102018004088.8, dated Feb. 28, 2019.

* cited by examiner

SECURITY ELEMENT COMPRISING MICROREFLECTORS

BACKGROUND

The invention relates to a security element with microreflectors, wherein the microreflectors are structured such that they present at least one object with a motif effect.

Optically variable effects are regularly used in security elements, which are provided for banknotes, passports or cards in particular. For example, a color shift effect can be achieved by means of color-shifting effect pigments or color-shifting multilayer structures. When changing the viewing angle of the security element, the color shifts or changes, for example, from red to green. A second group of optically variable effects are tilt-image effects. An image is visible at only one viewing angle and is not visible at another viewing angle. In addition to these simple optically variable effects, there are so-called motif effects in which the object represented moves, for example, shows a flowing motif transition or has a three-dimensional effect.

In the prior art, it is known to produce motif effects by microreflectors. By way of example, reference is made to WO 2011/066990 A2, WO 2012/000669 A1, WO 2015/078572 A1 and WO 2016/180522 A1. The microreflectors are formed in a microreflector pattern, so that the flat security element is divided into a multiplicity of pixels, each of which comprises at least one optically effective facet, i.e. at least one microreflector. The flat shape of the security element defines a main plane. The microreflectors are, for example, oriented in such a way in WO 2015/078572 A1 that the motif shows a motif movement effect when the security element is tilted.

In WO 2011/066990 A2, the micromirrors produce a motif with an apparently bulged surface (motif bulge effect). A motionless motif that is floating above or below the main plane for the viewer is described in WO 2016/180522 A1 (motif plane effect). The application DE 102017004586 mentions that a change of motif is possible for a motif plane effect.

Fundamentally, it is known to provide several security elements with different motifs or with partly also different effects on a security document. In addition, security elements with two, three or more simultaneously visible motifs, which likewise show different effects, increasingly are employed in practice. In addition to a first motif with a color shift effect, for example, a further motif with a bulge effect is provided in a second region of the security element, and a floating motif is provided in a third region. It is even possible to provide a motif change in the second (or third) region, thus, depending on a viewing angle, for example to show a first or second bulge effect motif (or floating motif).

Security elements with microreflectors that show a motif effect are difficult to replicate, since the motif effect can usually not be achieved with conventional printing techniques. At the same time, the motif effect is recognizable to the normal viewer; the microreflectors thus implement a security element that is distinctive.

It is therefore the object of the invention to so further develop a security feature with microreflectors which are structured in such a manner that they present at least one object that the recognizable effect is particularly distinctive.

SUMMARY

The invention is defined in the independent claims. The dependent claims relate to advantageous further developments.

A flat security element has microreflectors and, due to its flat form, sets a main plane. The microreflectors are arranged in a microreflector region and present to the viewer at least one motif which has two motif effects when the security element is tilted. The microreflector region is formed in such a manner that the first motif effect occurs when the plan-view direction is guided in a tilting movement about a primary axis and at the same time is oriented within a first tilting angle range about a secondary axis. Another type of motif effect occurs during a tilting movement, optionally even the same, about the primary axis when the plan-view direction lies in a different, second tilting angle range about the secondary axis. The motif effects are thus associated with different tilting positions about the secondary axis. The tilting about the secondary axis thus switches with reference to the type of motif effect that appears during the tilting movement(s) about the primary axis.

The axes lie obliquely to one another in the main plane, preferably at an angle between 70° and 90° to one another, particularly preferably at right angles to one another.

Tilting the plan-view direction (with the security element fixed) is equivalent to tilting the security element with the direction of viewing fixed.

Through the behavior depending on the tilting position about the secondary axis when tilting about the primary axis the viewer of the security element obtains a very distinctive appearance, since different motif effect types are present in the tilting about the primary axis. The security element thus shows a very distinctive appearance that is easily perceptible to a viewer and thus easy to check.

The tilting range about the primary axis, in which the tilting movement must take place, is preferably the same for the first and the second motif effect. But it can also be different, optionally even disjoint.

The security feature is formed such that different motif effects are combined. In the present case, a distinction is made between color effects, tilt-image effects and motif effects. A color effect can be a color shift, i.e. a direct change of color (from red to green), or a color transition, i.e. a color that changes—more or less continuously—with the tilting. A color effect is not a motif effect in the present sense. In a tilt-image effect, the image is visible at a first tilting angle and disappears when the tilting angle changes. Tilt-image effects are characterized by a binary or static behavior, even if they are combined with one another with the objective of an image change. Thus, for example, an apple as the first image can disappear at a first viewing angle and a pear can appear. Tilt-image effects are not motif effects in the present sense.

Motif effects, in particular the first and the second motif effect, can be motif movement effects, motif transition effects, motif plane effects and/or motif bulge effects.

Motif movement effects in the present sense are movements of a represented object with reference to the main plane. In particular, the outline and area of the object represented are constant. The object can move linearly or on a curved path in the main plane and/or it can rotate. Analogously, subareas in the object can move in linear, curved or rotating manner with reference to the main plane. The movement takes place in the main plane in pure motif movement effects.

In contrast, if the outline or the size or area of an object changes, a motif transition effect is present. As motif transition effects, there are known outline transitions, like an apple that turns into a pear . . . , (continuous) size changes or pumping effects. In the case of a pumping effect, the size of an object or of a subarea of the object initially increases in order to decrease again when it is tilted further in the same direction. This reversing size change preferably occurs several times in succession. Motif movement effects and motif transition effects are motif-dynamic motif effects.

Motif plane effects and motif bulge effects are three-dimensional motif effects. In a bulge effect, the object appears to the viewer, for example, as a three-dimensional or bulged object. In addition, when tilting, there shows a light reflex traveling on the object, corresponding to the bulging. In a motif plane effect, the object (bulged or non-bulged) lies above or below the main plane or, possibly, is arranged obliquely at an angle to the main plane. When the security element is tilted, the viewer sees the, for example floating, object (also) arranged outside the main plane in different representations adapted to the tilting angle. The object, which is motionless for the viewer, is moved in its position only in accordance with the perspective.

All types of motif effects described briefly so far are known taken alone. By way of example, reference is made again to WO 2011/066990 A2, WO 2012/000669 A1, WO 2015/078572 A1 and WO 2016/180522 A1.

A more recent expression of a motif plane effect is referred to here as motif plane movement. Being tilted, the object moves relative to the main plane (i.e. not only in the main plane) for the viewer. In particular, when tilting, a distance to the main plane changes (for example lying above to lying in the main plane or lying below the main plane) and/or an arrangement angle of the object to the main plane (object inclined at a first angle moves, in particular beyond the position parallel to the main plane until a second angle of inclination is reached).

The motif effect types of the first motif effect and of the second motif effect are different. In contrast to a pure motif change or a pure change between two similar motif effects, the presently proposed change of the motif effect type is particularly distinctive for the viewer and additionally even more difficult to imitate for a forger.

Overall, the motif effects can also be referred to as motif-dynamic and/or three-dimensional motif effects. Being tilted, the motif effects show to the viewer a representation that changes with regard to the object shape (outline and/or size), the object position and/or the object perspective. The change of the representation of the motif effect takes place with intermediate steps, from a first to a second representation, which differ with regard to object shape, position and/or perspective.

In preferred embodiments, a motif-dynamic motif effect is employed as the first motif effect and a three-dimensional motif effect is employed as the second motif effect.

If the first motif effect is a motif movement effect, in particular with a linear, non-linear or rotating motif movement, and the second motif effect is a motif bulge effect, a clearly different effect of the two motif effects is created (moved as compared to statically three-dimensional).

A motif transition effect as the first motif effect and a three-dimensional motif effect, such as motif bulge or motif plane effect, as the second motif effect, also supply the viewer with a distinctive difference (changing motif as compared to a constant motif with a three-dimensional effect).

A particularly distinctive effect occurs in another manner if the first motif effect is a motif bulge effect and the second motif effect is a motif plane effect. The motif plane effect is particularly emphasized here, since both effects actually have a three-dimensional effect.

It is conceivable to employ a combined motif movement and transition effect as the first (or second) motif effect. Motif plane effects can theoretically also be combined with other motif effect types. For example, a combined bulge and movement effect or a combined bulge and motif transition effect can be implemented predictably.

The microreflector region has a first and a second microreflector subregion, which are at least partially nested in one another. The microreflectors of the first microreflector subregion produce the first motif effect and the microreflectors of the second microreflector subregion produce the second motif effect.

The microreflectors can
be arranged regularly in both microreflector subregions, in particular thus forming microreflector subpatterns, or
be arranged regularly in one of the two microreflector subregions and irregularly in the other of the two microreflector subregions, or
be arranged irregularly in both microreflector subregions.

The security element optionally has at least one first and one second microreflector subpattern, which differ in their structure of the microreflectors with regard to the type of motif effect produced and are at least partially nested in one another and each produce one of the motif effects. The microreflectors are preferably arranged in two partial subpatterns, wherein each subpattern causes exactly one of the motif effects. It is therefore possible to arrange two microreflector subpatterns in a manner at least partially nested in one another for the two effects, so that microreflectors of the one subpattern are adjacent to or surrounded by microreflectors of the other subpattern. Checkerboard-like nesting, line-like nesting or any desired helically nested microreflector patterns are equally possible in order to present the object or objects with the different motif effects during the different tilting processes.

Nestings of regular arrangements of the microreflectors (patterns) are easier to compute than irregular arrangements and are therefore preferred.

The differences in the microreflector subpatterns relate to the formation of the individual pixels and their arrangement, which leads to the presentation of the respective motif effect. This difference does not necessarily require a different geometric division or distribution of the pixels within a microreflector subpattern. In terms of their structural division, the microreflector subpatterns, as will be shown by embodiment examples, can even be completely identical and only offset from one another, i.e. have the same basic structure with regard to the distribution of pixels in a top view. Of course, the microreflectors of the two microreflector subpatterns are configured geometrically differently and cause the different motif effects.

It is particularly preferred to nest the two microreflector subpatterns in one another so that both microreflectors of the first and of the second subpattern lie in individual area regions. The ratio of the nesting should preferably lie in the interval from 30:70 to 70:30, particularly preferably in the range from 40:60 to 60:40.

The microreflectors are preferably smaller than 30 µm. The (uniform or varying) size of the microreflectors is further preferably between 1 and 30 µm, further preferably between 10 and 20 µm.

The tilting angle ranges correspond to viewing angle ranges in which the motif effects occur. Optionally, the motif or its components are visible in these angular ranges only in a top view. It is possible that one of the tilting angle ranges is centered around a perpendicular plan view of the main plane and the other is not. This is the case if the other tilting angle range only contains angles smaller than 90° to the main plane. Equally, it is also possible, however, that the two tilting angle ranges are centered around different, oblique viewing angles to the main plane. In particular, it is possible that the motif effect or motif effects or even the motif or parts thereof are not recognizable at all in a perpendicular top view.

The motif effects preferably refer to the same component of the motif, i.e. a common object. Alternatively, different components, i.e. objects of the motif, each show one of the motif effects. It goes without saying that depending on the plan-view direction, either the first or the second motif effect is created for the viewer. The plan-view direction chosen by the viewer determines the represented one of the two motif effects. In other words, the first and second motif effects only occur with the corresponding plan-view direction, i.e. within the first or second tilting angle range to the secondary axis respectively.

The microreflector region contains a multiplicity of microreflectors. As is known from the prior art, for example WO 2011/066990 A2, these can be formed in the form of pixels. A pixel is a small area region in which there lie at least one, preferably several microreflectors, which have a uniform geometry and represent an image point of the presented object. Their reflection properties, such as, for example, geometry, orientation and/or coating, are executed in such a way that they create an image point of the presented object. Since the micromirrors work in reflection, it is not absolutely required to arrange them side by side in the manner of a conventional printed image in accordance with the image points to be represented. Rather, the microreflectors present an image by reflection of incident illuminating radiation and can therefore also lie in a spatial arrangement on a substrate for a certain viewing distance range, which spatial arrangement is detached from the spatial position of the image points of the presented object to be produced. In this description, therefore, deliberately no mention is made of a "representation of an image", but of the presentation. This is intended to express the projection properties that the microreflectors utilize in the image production.

The geometry of the preferably planar microreflectors is preferably formed uniformly in the microreflector region, in particular in both subregions and in the background region. All microreflectors have the same size and shape (e.g. square, pentagonal or hexagonal). The geometry of the microreflectors can alternatively be formed differently in one of the microreflector subregions, wherein the geometry of the microreflectors of the other microreflector subregion can in particular be formed uniformly or differently. Thus, consistently planar microreflectors can be employed with different shapes in the first subregion (e.g. partially square, partially irregular with possibly different sizes) and uniform size and shape in the second subregion.

The different motif effects are particularly easy to recognize when the motif is arranged against a background that appears dark. It is therefore preferred to provide a microreflector background pattern in the microreflector pattern, the microreflectors of which are inclined relative to the main plane in such a manner that they appear dark within the tilting orientations in which the motif effects are presented and thus form an object background.

In one embodiment, a value document, for example a banknote, an identification document, a check, an electronically readable card, etc., is configured as a value document with a security element of the type mentioned.

To manufacture the security element, a flat substrate, which defines a main plane due to this shape, is equipped with microreflectors that present at least one object. The object shows a motif effect when the security element is tilted. For this purpose, at least the first and the second microreflector subregion are formed, possibly as a pattern, in a manner nested in one another on the security element. The two microreflector regions differ from one another with regard to the type of motif effect produced, as mentioned above.

The microreflectors are produced by embossing and optionally (before or after the embossing) by applying a reflection-increasing coating. The reflection-increasing coating can be produced by vapor deposition of a metallic/HRI layer or by printing on metallic effect colors. The reflection-increasing coating can cause an additional color shift effect if it has a multilayer structure (reflector, dielectric, absorber or HRI layers) or interference pigments.

BRIEF DESCRIPTION OF THE DRAWINGS

The invention is explained in more detail below with the aid of embodiment examples with reference to the attached drawings, which likewise disclose features that are essential to the invention. These embodiment examples are merely illustrative and are not to be interpreted as restrictive. For example, a description of an embodiment example with a multiplicity of elements or components should not be interpreted to mean that all of these elements or components are necessary for implementation. Rather, other embodiment examples can also contain alternative elements and components, fewer elements or components or additional elements or components. Elements or components of different embodiment examples can be combined with one another, unless stated otherwise. Modifications and variations, which are described for one of the embodiment examples, can also be applicable to other embodiment examples. To avoid repetitions, the same or mutually corresponding elements in different figures are identified by the same reference numerals and are not explained several times. In the figures there are shown.

DETAILED DESCRIPTION OF VARIOUS EMBODIMENTS

Figure 1:
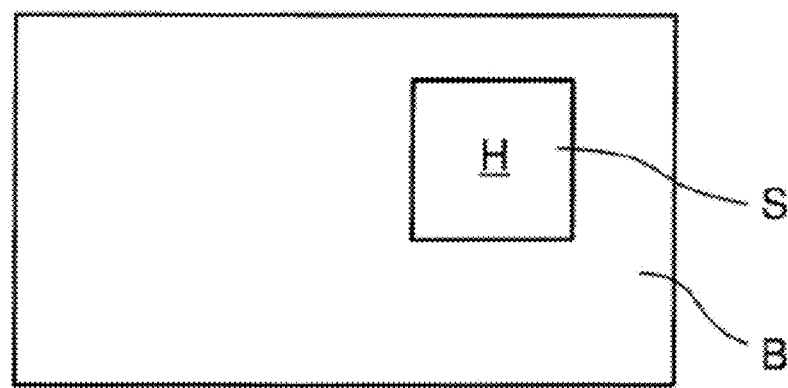
FIG. 1 a top view of a banknote with a security element.

FIG. 1 shows schematically a banknote B with a security element S. The banknote B comprises printed banknote paper, and the security element S is configured as a foil element which has been applied to the banknote paper. Due to the flat configuration of the security element S and the banknote B, the security element S sets a main plane H, which coincides with the plane of the drawing in FIG. 1.

Figure 3:
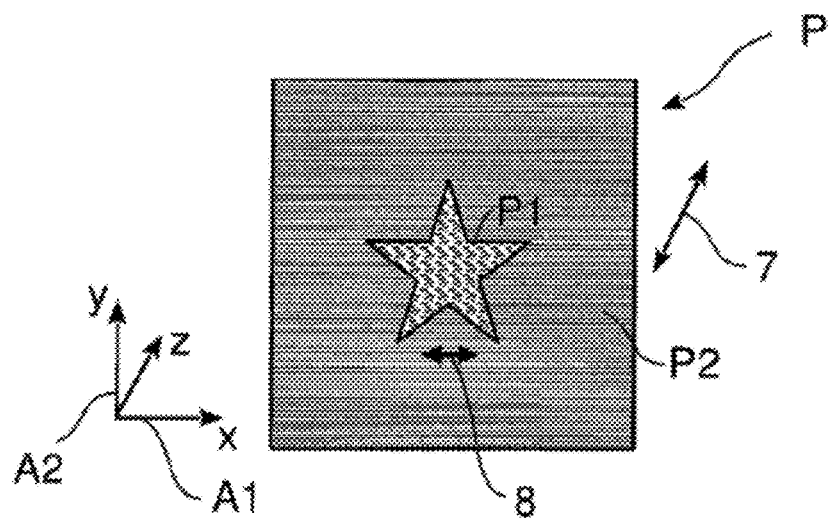
Figure 4:
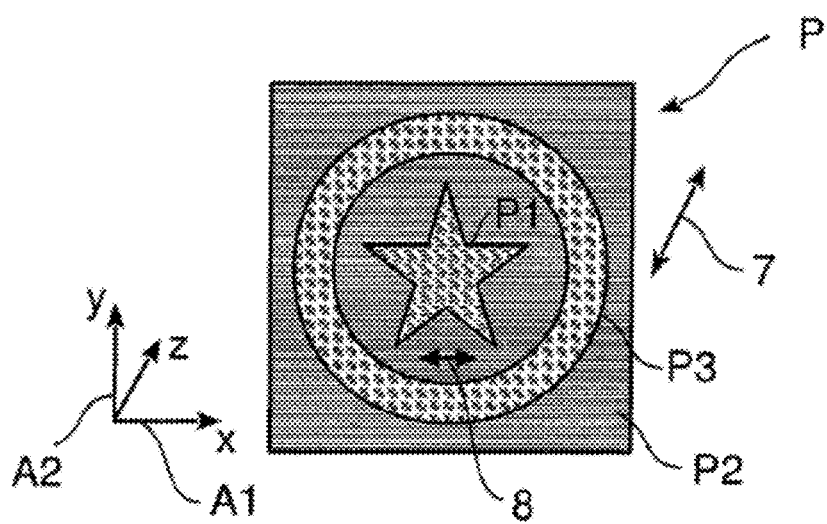

The security element S has a multiplicity of microreflectors, which present a motif P with objects P1, P3 to the viewer in top view. FIG. 3 schematically shows a top view of the security element S with an object P1; FIG. 4 relates to an embodiment with two objects P1, P3.

Figure 2:
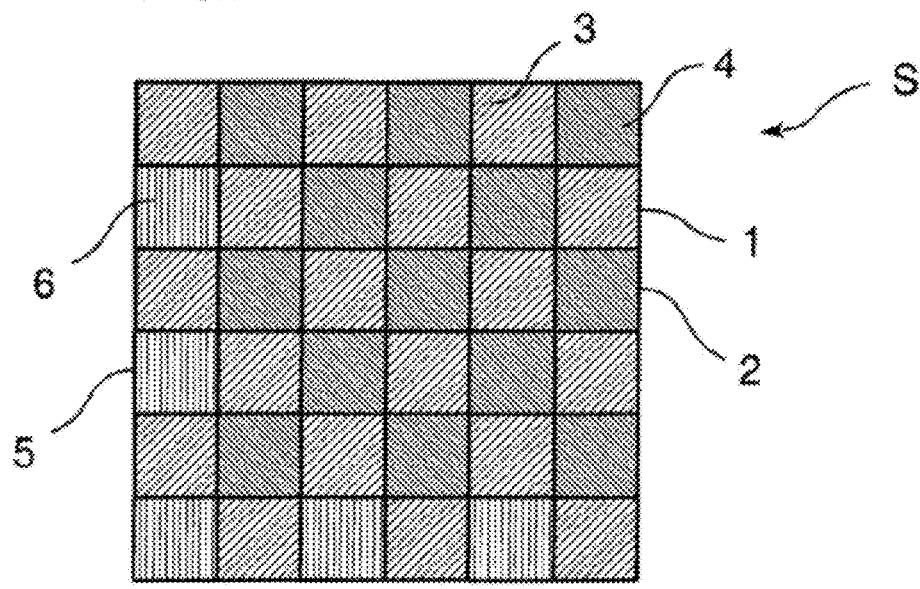
FIG. 2 a schematic representation of the structure of the security element of FIG. 1, FIGS. 3 and 4 schematic representations of motifs which the security element of FIG. 2 presents to a viewer in a top view and which move differently when the security element is tilted, and FIG. 5 a representation of the security element to clarify tilting angle ranges for the tilting processes.

In both cases, the security element S has two microreflector patterns 1, 2, which in the embodiment of FIG. 2 are nested in one another in the manner of a checkerboard pattern, so that horizontally and levelly microreflector pixels 3 of the first microreflector pattern 1 alternate with microreflector pixels 4 of the second microreflector pattern 2. Further, a third microreflector pattern 5 is provided, which has microreflector pixels 6. As will be explained later, these are provided for producing a background and are arranged such that they are dark in a viewing angle range in which the first and/or second microreflector patterns 1, 2 show a motif effect.

The microreflector region is produced by embossing, for example in a (UV) curable lacquer layer or a softened plastic layer. A reflection-increasing coating, such as a metal layer, HRI layer, metal-effect pigment layer or a multilayer structure, can be vapor-deposited or printed on. Recesses in the coating can be produced selectively (washing/etching/lasering) or can be provided during application (by masking or by printing technology). Colorants or pigments, in particular effect pigments such as interference pigments, can additionally be provided on or in the coating and/or the embossed layer.

FIG. 3 shows schematically the presented motif P of the security element S. The main plane H corresponds here to the x/y plane of a Cartesian coordinate system that is entered. Both microreflector patterns 1, 2 are configured with regard to their microreflector pixels 3, 4 in such a way that they present a star P1, which, however, shows different motif effects 7, 8 in dependence on the tilting. Which motif effect appears depends on the tilting position about the secondary axis A2. The motif effect occurs both times during a tilting movement about the primary axis A1. The one (first) motif effect 7 causes the optionally three-dimensionally appearing star P1 to move forwards or backwards relative to the main plane H (a motif plane effect). This is illustrated by the oblique double arrow. Alternatively, the first motif effect can be a bulge effect. The star P1 then appears as a three-dimensionally bulged object on which, when being tilted, a light reflex travels in accordance with the bulging.

The microreflector pixels 4 of the second microreflector pattern 2, on the other hand, are configured such that the other (second) motif effect, which occurs when the security element S is tilted about the primary axis A1, shifts the star P1 parallel to the main axis H. This motif effect 8 is illustrated by a horizontal double arrow (and is a motif movement effect).

It is essential that the two motif effects differ as clearly as possible for the viewer. In particular, the following examples for the first and/or the second motif effect come into question: In a first example, the star P1 floats above the main plane H and changes its distance from the main plane H when the security element is tilted about the primary axis A1. In a second example the star P1 changes its representation in such a manner that it appears at different angles to the main plane H. For example, the star appears so inclined to the main plane H in a first inclined position that the left half of the star dips underneath the main plane H, the right half rises upward over the main plane H. When tilting about the primary axis A1, the conditions are inverted exactly, with the star thus showing a kind of flip effect by changing its inclined position and thus having a motif plane movement that has a component extending perpendicular to the main plane H. In both examples, the star P1 can optionally have a three-dimensional presentation effect. However, can also be a two-dimensional object. In a third example, a three-dimensional configuration, e.g. a bulge, of the star P1 varies when being tilted about the axis A1. In a fourth example, the star P1 shifts laterally in the main plane. Here, too, it can have a 2D or 3D appearance.

In addition, a background P2 is provided in the motif P, which is produced by the third microreflector pattern 5. It is dark, which makes the P1 object particularly distinctively recognizable.

FIG. 4 shows an embodiment in which the two motif effects are divided between two objects P1, P3 of the motif P. The microreflectors, which produce the motif effect of the two objects, are again arranged in a manner nested in one another. Contrary to the selected representation in FIG. 4, the objects are not recognizable to the viewer at the same time (or at least their motif effects are not). In a first example, the first object P1, the star, moves from the left to the right edge of the motif P in a first plan-view direction. For this plan-view direction, the security element is rotated for example by +30 degrees about the axis A1 by the viewer (0 degrees then corresponds to a plane-parallel plan view). The ring as the second object P3 is not visible when tilting about the axis A2 (or statically weakly recognizable independently of the tilting angle). When the viewer changes the plan-view direction to −30 degrees, i.e. rotates the security element by 60 degrees about the axis A1, the ring becomes visible as the object P3 and the second motif effect occurs in the subsequent tilting about the axis A2. The ring P3 floats, for example, in front of or behind the main plane of the security element. Depending on the tilting angle, the viewer sees the floating ring three-dimensionally from different perspectives. Alternatively, for example, partial elements of the three-dimensionally appearing ring (in combination with a bulge effect) rotate (motif movement effect) when being tilted. Likewise, the size of the ring could, for example, shrink to the size of the star (not visible or only visible independently of the tilting angle) when being tilted. Otherwise, the above applies equally.

Figure 5:
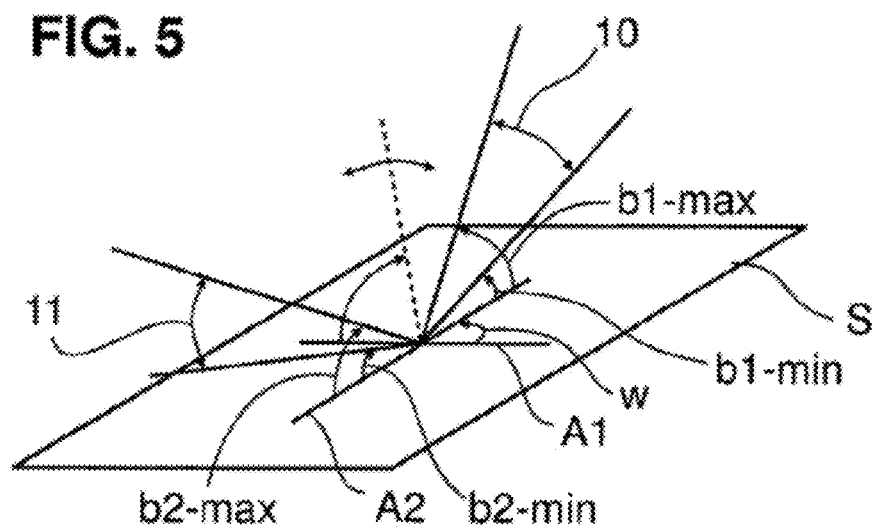

FIG. 5 shows the orientation of the tilting angle ranges 10, 11 for the two motif effects. The tilting angle ranges are each ranges of a tilting orientation about the secondary axis A2 and define the viewing angle ranges in which the motif is visible with the first or the second motif effect. The tilting angle range 10 applies to the first motif effect, which then shows when being tilted about the primary axis A1. It is defined by a minimum tilting angle b1-min and a maximum tilting angle b1-max about the secondary axis A2. These two angles are of course measured with respect to the axis A1, as is the result of geometric laws. When a tilting movement about the primary axis A1 takes place within the tilting angle range 10, as symbolized by the dashed line in FIG. 5, the first motif effect is shown, which, for example, is produced by the first micromirror pattern 1. The same applies to the same tilting movement about the primary axis A1, if at the same time the tilting angle about the secondary axis A2 lies within the corresponding angles −b2-min and −b2-max, which define the second tilting angle range 11. A movement in the form of a tilting about the axis A1 then produces the second motif effect, which, for example, is caused by the second microreflector pattern 3.

The axes A1 and A2 lie in the main plane H, which is spanned by the flat security element S. They have an axis angle w to one another, which in the embodiment shown amounts to 90° purely by way of example.

The motif effects of the motif P are achieved in that the microreflectors 3, 4 and 6 in the associated microreflector patterns 1, 2 and 5 are individually inclined accordingly. To ascertain the corresponding alignments of the microreflectors, a corresponding reflector design is first computed separately for the two motif effects. With respect to this, reference is made to the prior art. Subsequently, the reflector designs are scaled in the direction of the axes A1 and A2 with a factor and shifted differently with reference to the axis A2 for the two motif effects into a corresponding mirror slope range, so that the tilting angle ranges for the tilting about the axis A2 are predetermined. The pixels are then correspondingly nested with one another, for example in a checkerboard manner, as shown in FIG. 2. The pixel size typically corresponds to 10 to 20 μm. The ratio of the nesting of pixels of the first microreflector structure 1 to pixels of the second microreflector structure 2 is in the ratio of 30:70 to 70:30, preferably in the range of 40:60 to 60:40.

All reflector elements that are not occupied in the reflector designs are optionally equipped with a very steep slope against the main plane H, so that they appear dark in the respective tilting angle ranges. A variation of the steep slopes in the sense of noise is expedient here. This creates the third microreflector pattern 5 for the background. It contains the microreflectors 6.

It is preferred that all objects which show the first or second motif effect are completely surrounded by dark reflectors, i.e. reflectors belonging to the third microreflector pattern 5 of the background P2.

All of the embodiments of the security element can be implemented as foil elements, as foil elements on window recesses or as a security thread. They can be attached to paper or polymer banknotes on both the front and the back side. The same applies to security documents, identification documents or other products to be secured. As an alternative to creation as a separate element and application to the product to be protected, the security element can be created directly on the product to be protected.

The invention claimed is:

1. A flat security element with microreflectors, wherein the flat security element has a main plane and the microreflectors are arranged in a microreflector region and present at least one motif for a viewer, said motif having a motif effect when the security element is tilted,
    wherein the microreflector region causes a first motif effect and a second motif effect, said first motif effect being a different motif effect type than said second motif effect,
    wherein the first motif effect occurs during a tilting movement about a primary axis lying in the main plane, only when a viewing angle is oriented within a first tilting angle range about a secondary axis that is oblique to the primary axis and lies in the main plane,
    wherein the second motif effect occurs during a tilting movement about the primary axis, only when the viewing angle is oriented within a second tilting angle range about the secondary axis, and
    wherein the motif effect type of the first motif effect and the second motif effect each comprise a different one of:
        motif movement effect,
        motif transition effect,
        motif bulge effect, and
        motif plane effect.

2. The security element according to claim 1, wherein the microreflector region has a first and a second microreflector subregion which are at least partially nested in one another,
    wherein the microreflectors of the first microreflector subregion produce the first motif effect and the microreflectors of the second microreflector subregion produce the second motif effect.

3. The security element according to claim 2, wherein the microreflectors are arranged at uniform intervals in both microreflector subregions, or are arranged at uniform intervals in one of the two microreflector subregions and are arranged at non-uniform intervals in the other one of the two microreflector subregions, or
are arranged at non-uniform intervals in both microreflector subregions.

4. The security element according to claim 1, wherein the first motif effect is a motif movement effect and the second motif effect is a motif bulge effect.

5. The security element according to claim 1, wherein the first motif effect is a motif transition effect and the second motif effect is a motif bulge or motif plane effect; or
    that the first motif effect is a motif bulge effect and the second motif effect is a motif plane effect.

6. The security element according to claim 1, wherein the first motif effect is a movement of the motif or of components of the motif perpendicularly to the main plane and the second motif effect is a movement of the motif or of components of the motif parallel to the main plane.

7. The security element according to claim 1, wherein the primary and secondary axes enclose an angle of at least 70°.

8. The security element according to claim 7, wherein the primary and secondary axes enclose an angle of at least 90°.

9. The security element according to claim 1, wherein the microreflector region has a microreflector background, the microreflectors of which are inclined such that they, when the security element is tilted about the primary axis in the first tilting angle range and the second tilting angle range about the secondary axis, appear dark and thus form an object background.

10. The security element according to claim 1, wherein the motif comprises at least two objects, one of which shows the first motif effect and the other one the second motif effect.

11. The security element according to claim 1, wherein the motif comprises an object which shows the first motif effect and the second motif effect.

12. The security element according to claim 1, wherein a geometry of the microreflectors of the microreflector region is formed uniformly.

13. The security element according to claim 1, wherein at least one of the tilting angle ranges contains only tilting angles smaller than 90° to the main plane.

14. The security element according to claim 13, wherein at least one of the tilting angle ranges contains only tilting angles between 20° and 70° to the main plane.

15. The security element according to claim 14, wherein at least one of the tilting angle ranges contains only tilting angles between 40° and 60° to the main plane.

16. A value document with a security element according to claim 1.

17. A manufacturing method for a flat security element, wherein a flat substrate, which defines a main plane, is equipped with microreflectors which are arranged in a microreflector region and present at least one motif which has a motif effect when the security element is tilted,
    wherein the microreflector region is formed such that it causes a first and a second motif effect with different motif effect types,
    wherein the first motif effect occurs during a tilting movement about a primary axis lying in the main plane, only when a viewing angle is oriented within a first tilting angle range about a secondary axis oblique to the primary axis and lying in the main plane, and the second motif effect occurs during a tilting movement about the primary axis, only when the viewing angle is oriented within a second tilting angle range about the secondary axis wherein the motif effect types of the first motif effect and the second motif effect each comprise a different one of:
motif movement effect,
motif transition effect,
motif bulge effect, and
motif plane effect.

18. The manufacturing method according to claim 17 adapted for manufacturing a security element comprising an embossing step in which the microreflector region is produced by embossing, and/or a coating step in which the microreflector region is equipped with a reflection-increasing coating.

19. A flat security element with microreflectors, wherein the flat security element has a main plane and the microreflectors are arranged in a microreflector region and present at least one motif for a viewer, said motif having a motif effect when the security element is tilted, wherein the microreflector region causes a first motif effect and a second motif effect, said first motif effect being a different motif effect type than said second motif effect, wherein the first motif effect occurs during a tilting movement about a primary axis lying in the main plane, only when a viewing angle is oriented within a first tilting angle range about a secondary axis that is oblique to the primary axis and lies in the main plane, wherein the second motif effect occurs during a tilting movement about the primary axis, only when the viewing angle is oriented within a second tilting angle range about the secondary axis, wherein the microreflector region has a first and a second microreflector subregion which are at least partially nested in one another, and wherein the microreflectors of the first microreflector subregion produce the first motif effect and the microreflectors of the second microreflector subregion produce the second motif effect.

\* \* \* \* \*